US00RE35869E

United States Patent [19]

Mohwinkel

[11] E Patent Number: Re. 35,869

[45] Reissued Date of Patent: Aug. 11, 1998

[54] MINIATURE ACTIVE CONVERSION BETWEEN MICROSTRIP AND COPLANAR WAVE GUIDE

[75] Inventor: Clifford A. Mohwinkel, San Jose, Calif.

[73] Assignee: Endgate Corporation, Sunnyvale, Calif.

[21] Appl. No.: 903,239

[22] Filed: Jul. 12, 1997

Related U.S. Patent Documents

Reissue of:

[64] Patent No.: 5,550,518
Issued: Aug. 27, 1996
Appl. No.: 490,019
Filed: Jun. 12, 1995

[51] Int. Cl.[6] ..... H01P 5/08

[52] U.S. Cl. ..... 333/33; 333/247

[58] Field of Search ..... 333/33, 246, 247, 333/32; 257/664, 728, 778; 330/307

[56] References Cited

U.S. PATENT DOCUMENTS

| | | |
|---|---|---|
| 4,587,541 | 5/1986 | Dalman et al. . |
| 4,864,645 | 9/1989 | Dixon . |
| 4,906,953 | 3/1990 | Li et al. . |
| 5,087,896 | 2/1992 | Wen et al. . |
| 5,227,738 | 7/1993 | Shiga . |
| 5,352,998 | 10/1994 | Tanino . |
| 5,428,327 | 6/1995 | Bahl . |

FOREIGN PATENT DOCUMENTS

| | | |
|---|---|---|
| 0 358 497 A2 | 3/1990 | European Pat. Off. . |
| 0 358 497 A3 | 3/1990 | European Pat. Off. . |
| 0 627 765 A1 | 12/1994 | European Pat. Off. . |
| 41 28334 A1 | 3/1993 | Germany . |
| 60-153602 | 8/1985 | Japan . |
| 63-240102 | 10/1988 | Japan . |
| 1-005102 | 1/1989 | Japan . |

OTHER PUBLICATIONS

M. Aikawa et al., "MMIC Progress in Japan", *IEEE 1989 Microwave and Millimeter-Wave Monolithic Circuits Symposium Digest of Papers*, Jun. 12–13, 1989, Long Beach, CA, pp. 1–6.

M. Goetz et al., "Measurement of a 24-GHz Broad-Band Multilayer Ceramic Feedthru for Microwave Packaging", *IEEE Microwave and Guide Wave Letters*, May 1992, No. 5, pp. 171–173.

H.B. Sequeira et al., "Monolithic GaAs W-Band Pseudomorphic Modfet Amplifiers", 12th Annual GaAs Symposium Technical Digest 1990, Oct. 7–10, 1990, pp. 161–164.

John J. Burke et al., "Surface-to-Surface Transition via Electromagnetic Coupling of Microstrip and Coplanar Waveguide", *IEEE Transactions on Microwave Theory and Techniques*, vol. 37, No. 3, Mar. 1989, pp. 519–525.

*Primary Examiner*—Paul Gensler
*Attorney, Agent, or Firm*—Edward B. Anderson

[57] ABSTRACT

An active device, such as a field effect transistor ("FET") or MMIC, converts microwave signals between a microstrip transmission line ("microstrip") and a coplanar wave guide ("CPW"). In microstrip-to-CPW conversion using a simple FET, a gate connection is made to the microstrip signal conductor. A drain connection is made to the center conductor on the CPW. Two FET source terminals are connected respectively to each CPW ground strip. The ground strips are electrically coupled to the microstrip ground plane with a minimum length connection so the inductance common to the FET input and output is minimized. The FET can be reconnected so as to reverse the input and output, providing for conversion of signals from CPW to microstrip. Conversion from microstrip to an intermediate CPW and back to microstrip provides for mounting an intermediate circuit, such as an amplifier or other MMIC, directly on the CPW.

18 Claims, 5 Drawing Sheets

MINIATURE ACTIVE CONVERSION BETWEEN MICROSTRIP AND COPLANAR WAVE GUIDE

Matter enclosed in heavy brackets [ ] appears in the original patent but forms no part of this reissue specification; matter printed in italics indicates the additions made by reissue.

FIELD OF THE INVENTION

The present invention relates to the field of signal transmission circuits, and in particular to conversions between microstrip and coplanar wave guide transmission lines.

BACKGROUND OF THE INVENTION

Microstrip transmission lines provide low-loss transmission of microwave and millimeter wave signals, particularly over extended distances as for example in antenna transmission lines. Coplanar wave guides are useful in microwave and millimeter wave circuits for transmitting microwave signals over one face of a substrate. They are ideally suited, for example, for flip chip mounted amplifiers.

Conversion between microstrip transmission mode and coplanar wave guide mode offers the circuit designer the advantages of low loss transmission of microstrip with extra-low common lead inductance associated with amplifiers, oscillators, or other circuits having active devices flip-chip mounted onto coplanar wave guides. Low common lead inductance is very important in amplifier design in particular principally because the inductance common to the input and output circuit reduces the stable gain of the amplifier.

Connecting a microstrip transmission line to a coplanar wave guide in the usual, passive way introduces loss due to the fact that the conversion usually takes several quarter wavelengths of transmission line to achieve. It is desirable to "launch" a microwave signal input supplied in a microstrip transmission line mode to a coplanar wave guide transmission mode with no loss of gain and have the Signal leave the coplanar wave guide with no loss in gain. It would be further desirable if such connection could be in the form of a monolithic microwave integrated circuit (MMIC), occupying a small space with few parts and therefore costing less to produce than current connection methods.

SUMMARY OF THE INVENTION

The present invention provides a small, easily implemented active "launch" or conversion between a microstrip transmission line and a coplanar wave guide that is economical and may readily be implemented in a form having a small size.

In an apparatus according to the present invention, an active device, which may be as simple as a BJT or a FET, or a more complex device, such as a MMIC, converts a microwave or millimeter wave signal conducted by a microstrip transmission line (hereinafter "microstrip") to a signal conducted by a coplanar wave guide (hereafter "CPW"), or a signal conducted by a CPW to one conducted by a microstrip.

In a first embodiment providing a microstrip-to-CPW launch using a FET as the active device, a gate connection is made to a microStrip signal conductor. A drain connection is made to the center conductor of the CPW. Preferably the FET is formed on a chip with two spaced common source terminals, with both source terminals connected to a CPW ground strip. The microstrip and CPW preferably have contiguous ends with the ground plane on the reverse side of the microstrip electrically coupled to the CPW ground strips with a minimum length connection. One method of making this connection is by ground vias. Also, wraparound grounds can be used with the two substrates to achieve low common lead inductance.

Similarly, a second embodiment provides a CPW-to-microstrip launch embodiment also using a FET as the mode converting device. In this embodiment, the gate connection is made to the center conductor of the CPW. The drain connection is made to the microstrip signal conductor. Each of two FET source terminals is connected respectively to one of the ground strips of the CPW and to the ground plane of the microstrip with minimum inductance. connectors.

By constructing microstrip-to-CPW interfaces in this manner, the inductance common to the input and output of the active device is minimized. This active microstrip to CPW or CPW to microstrip launch also can provide gain.

A particularly advantageous feature of this invention is that amplifiers, filters, mixers, etc. can be constructed in CPW with microstrip launchers on the input and output terminals. These circuits may be mounted on the CPW using flip chip die attachment, and MMICs may be formed with low and very controllable common lead inductance, since they are not dependent on the use of back side vias.

An appreciation of other advantages of the present invention and a more complete understanding of this invention may be achieved by studying the following description of preferred embodiments and by referring to the accompanying drawings.

SPECIFICATION OF PREFERRED EMBODIMENTS

Figure 1:
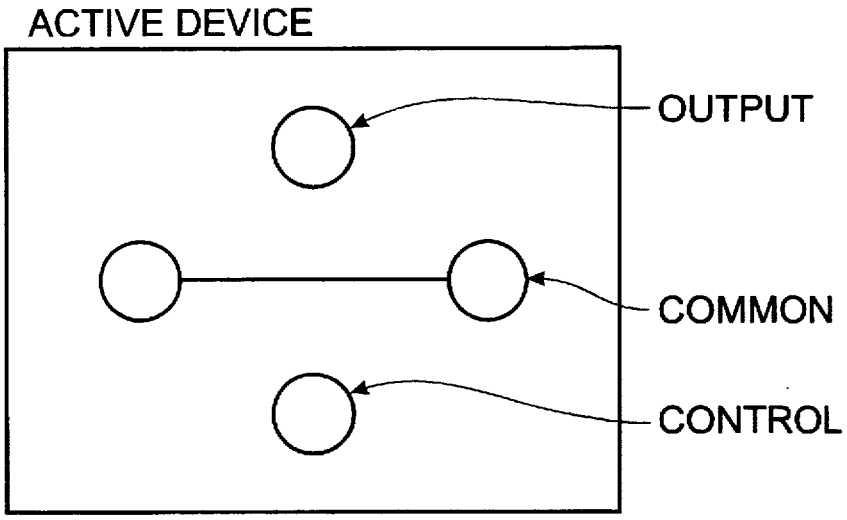
FIG. 1 is a general diagram showing distribution of terminals on an active device usable in a preferred embodiment of the invention.

As has been mentioned, the invention provides for low-loss conversion between microstrip and coplanar wave guide (CPW) transmission lines by the use of an active device at the interface. The invention works well when the active device is configured as shown in FIG. 1. An active device typically has a control terminal, an output terminal, and a common terminal, as shown. The common terminal is preferably brought out in two places in bilateral symmetry.

Figure 2:
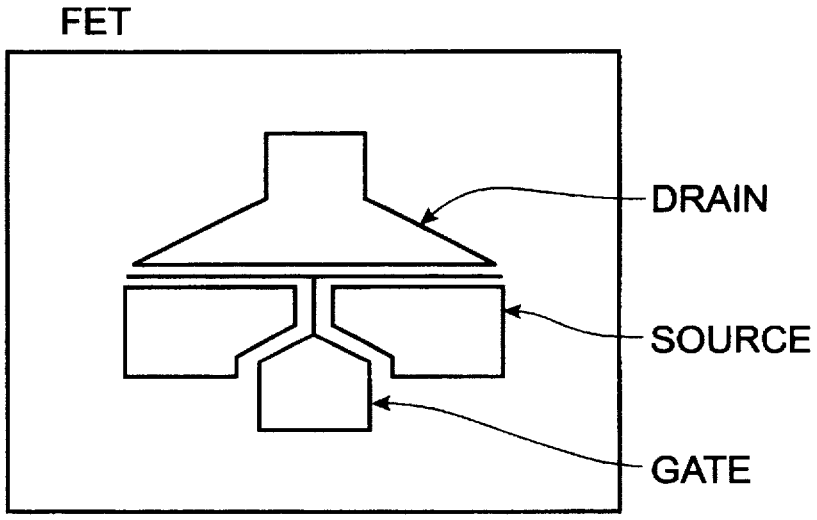
FIG. 2 is a diagram similar to FIG. 1 for a FET.

One or more field effect transistors (FETs) may be used to form the active device, as is shown in FIG. 2. A FET has opposing gate and drain terminals, and preferably an associated source terminal formed on each side of the gate. The bilateral symmetry shown falls out of the basic structure of the FET as well as the need to reduce common lead inductance by doubling the number of common terminals.

Although the preferred form of the active devices for the invention are shown herein as FETs, other forms of active devices, such as a bipolar junction transistor, can also be used when the terminals are properly configured.

Figure 3:
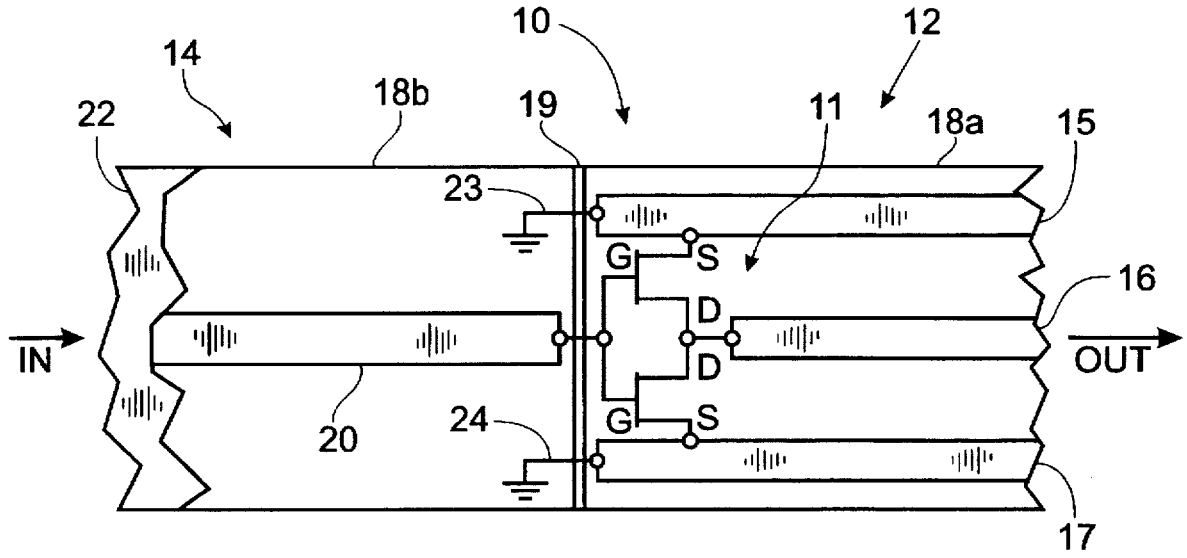
FIG. 3 is a schematic diagram of an embodiment of the invention used for launch from microstrip mode to coplanar wave guide mode utilizing a FET.

FIG. 3 shows in schematic form a launch 10 that converts a microstrip transmission line (microstrip) 14 to a coplanar wave guide (CPW) 12 using an active device 11. A pair of FETs, configured as shown in FIG. 2, form the active device. Note that the FET shown in FIG. 2 can be thought of as two FETs, each with its independent gate and source, and a common connected drain. That is, each source pad has its associated gate and portion of a common connected drain. As used herein, then, the term "active device" is intended to be considered in the general sense as a device having one or more active elements, such as FETs. When more than one element is used, the elements may be joined, as in the case of the FETs of FIG. 2, or may be independent. Collectively, regardless of the particular configuration used, they are referred to as an active device. This active device may have any reasonable form. For instance, it may be resident on a MMIC.

CPW 12 is formed by ground conductor strips 15 and 17 which flank a center signal conductor strip 16, all mounted on a substrate 18a. Correspondingly, microstrip 14 is formed by a planar signal conductor strip 20 mounted on a substrate 18b, and a ground plane 22 mounted on the underside of substrate 18b. Substrates 18a and 18b are also collectively and individually referred to as substrate means. One end of CPW substrate 18a is positioned against an associated end of microstrip t 4 in a butt joint 19. Ground plane 22 is electrically coupled to CPW ground strips 15 and 17 with minimum length connections 23 and 24.

The structure of the CPW can have various forms. The ground conductors may be indefinitely wide, for instance; there may be ground or other conductors on the other side of the substrate; or there may be cavities in the substrate. Other variations are also possible.

The common connected gates G of the FETs are connected to conductor strip 20 as close to the butt joint 19 as possible. Common connected drains D are connected to center conductor 16 on CPW substrate 18a. The FET sources S are connected respectively to a respective one of ground strips 15 and 17 as close to joint 19 as possible on the CPW substrate.

Figure 4:
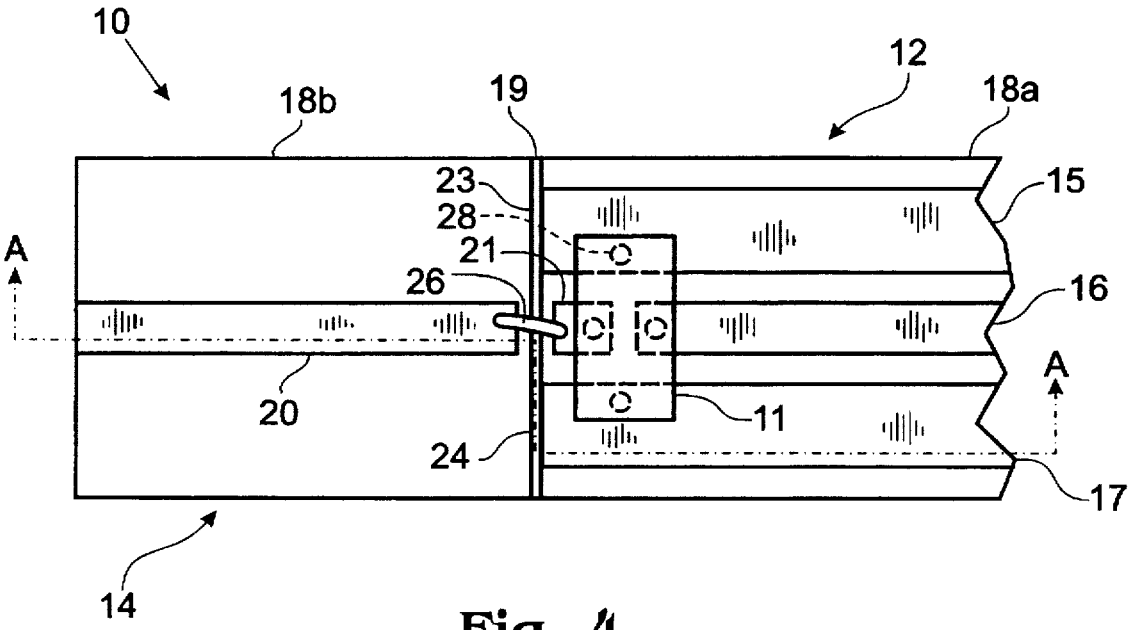
FIG. 4 is a plan view illustration of the embodiment of FIG. 3 using flip-chip mounting of the FET.

FIG. 4 illustrates a particular form of microstrip-to-CPW launch 10 of FIG. 3 in which active device 11 is a FET formed in a chip flip mounted over substrate 18a to the metalization of CPW 12. A conductor stub 21 mounted in line with conductor strip 16 adjacent to butt joint 19 provides a pad for connection of microstrip conductor 20 to the gate terminal of FET 11 via an air bridge or bond wire 26. The gate terminal of the FET is mounted onto stub 21. The drain terminal is mounted onto an end of conductor strip 16 adjacent to butt joint 19, and the source terminals are bonded to ground strips 15 and 17, as shown. Conventional flip-mounting techniques, such as thermocompression bonding or solder reflow, may be used. The flip-mounted connections are identified generally by bonds 28.

Figure 5:
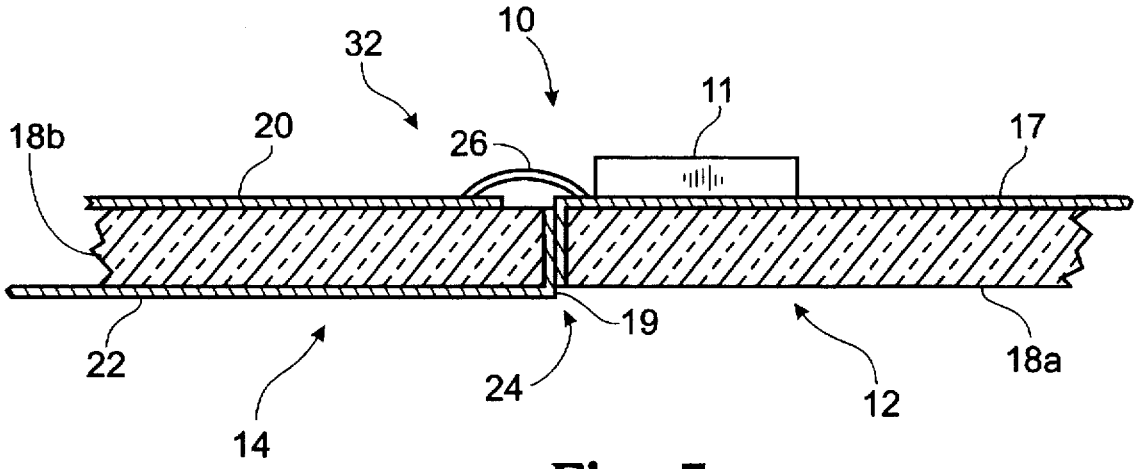
FIG. 5 is a cross-section taken along line A—A of FIG. 4, illustrating chip bonding and ground-plane to ground-strip coupling.

Ground plane 22 must be connected to ground strips 15 and 17. FIG. 5 shows, in cross section taken along line A—A in FIG. 4, one method of making the ground connection. This is achieved by wrapping the microstrip ground plane 22 around the end of the microstrip substrate 18b in joint 19, and wrapping ground strips 15 and 17 around the end of CPW substrate 18a, also in joint 19. When the respective substrates are butted together to form joint 19, the wrap-around portions of the ground plane and ground strips are placed in intimate contact. Mechanical and electrical connection can be made with solder or the connection can be made by welding gold ribbon (or other suitable metal) around the substrate. Additionally, these strips could be patterned onto the substrate using photo lithographic methods.

Figure 6:
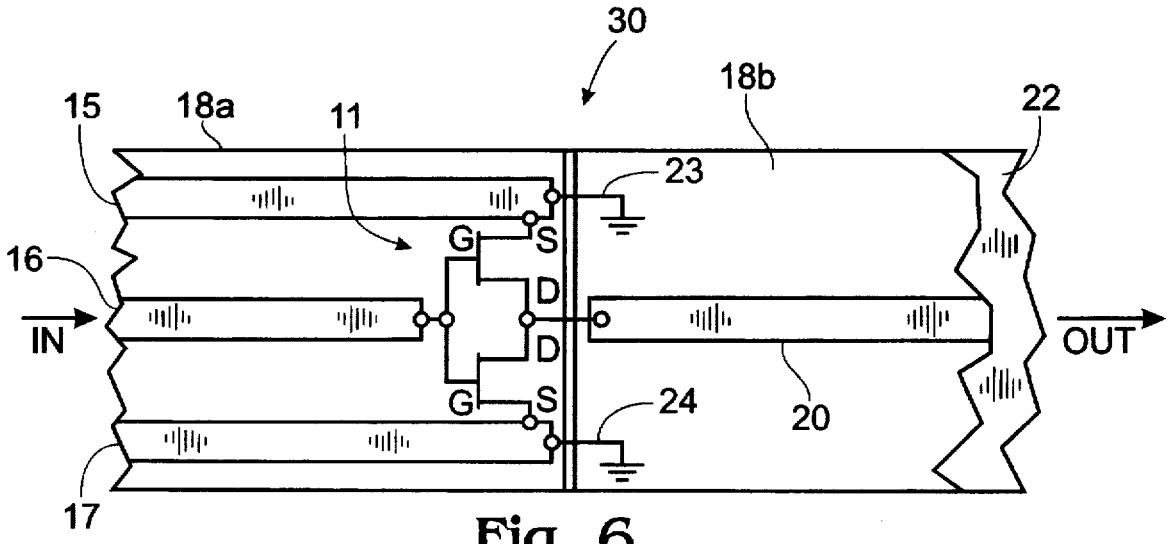
FIG. 6 is a schematic diagram of another embodiment of the invention used for launch from coplanar wave guide mode to microstrip transmission line mode, also utilizing a FET.

FIG. 6 shows a CPW-to-microstrip launch 30, again using a FET or MMIC as the active device 11. The gate G and drain D connections are reversed from the microstrip-to-CPW launch 10 embodiment of FIG. 3. That is, the gate terminals G are commonly connected to center conductor 16 of CPW 12 and the drain terminals D are commonly connected to planar conductor strip 20 on microstrip 14. The source terminals S are connected respectively to a corresponding one of ground strips 15 and 17 as close to joint 19 as possible, in the same manner as for microstrip-to-CPW launch 10. The CPW ground strips are likewise connected to the microstrip ground plane in the same manner. Thus, launch 30 is essentially a mirror image of launch 10.

Figure 7:
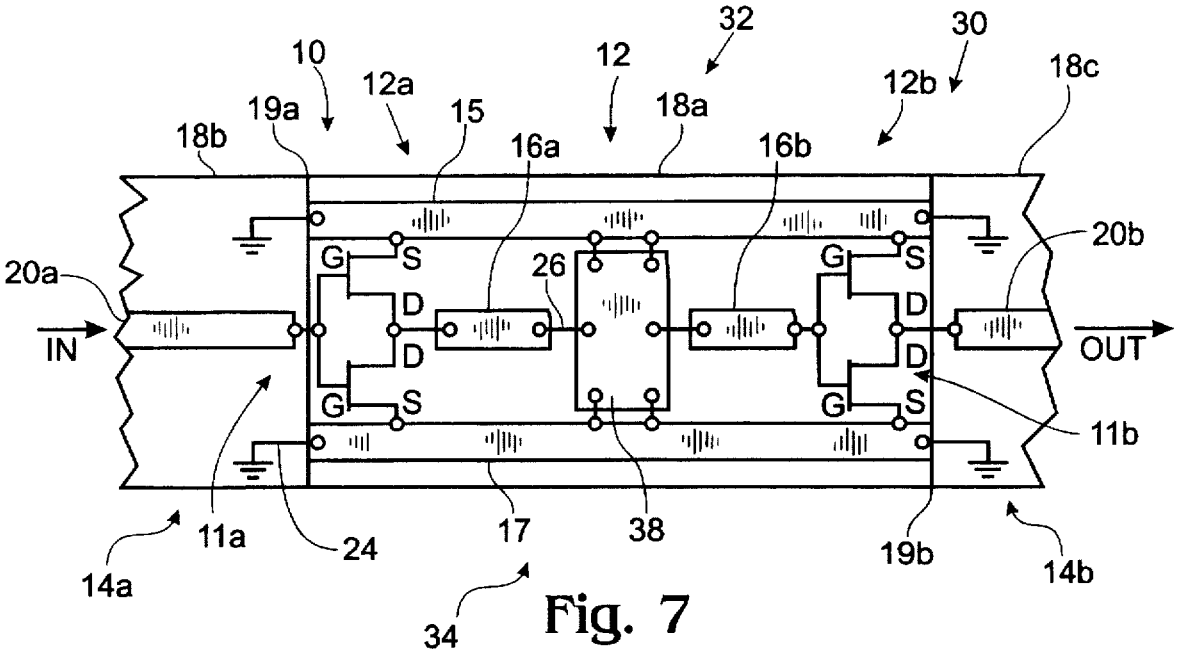
FIG. 7 is a schematic diagram illustrating use of the invention for conversion from microstrip mode to coplanar wave guide mode and reconversion back to microstrip mode.

FIG. 7 is a schematic diagram illustrating a compound circuit structure 32 made according to the invention. Structure 32 includes an intermediate circuit apparatus 34 structured in an intermediate CPW transmission mode. This structure also includes an input launch 10 from microstrip mode to CPW mode, as was described with reference to FIG. 3. Similarly, the structure includes an output launch 30, structured as shown in FIG. 6, providing conversion from the intermediate CPW mode back to microstrip mode.

As indicated in FIG. 7, the previously commonly identified elements of launches 10 and 30 are assigned respective identifiers "a" and "b". Thus, the active devices of launches 10 and 30 are identified as devices 11a and 11b, respectively. Similarly, launch 10 includes microstrip 14a and CPW 12a, and launch 30 includes microstrip 14b and CPW 12b. The substrates are labeled the same as described previously except for the output substrate 18c of launch 30. Input and output CPW sections 12a and 12b form a composite CPW 12, and have associated respective signal conductors 16a and 16b. An intermediate circuit 38 is connected to adjacent ends of CPW signal conductors 16a and 16b, as well as to ground strips 15 and 17, as shown, to form intermediate circuit apparatus 34. It will be appreciated that the circuits on substrate 18a, including both input and output launches and the intermediate circuit, could all be on a single MMIC.

The particular structure of intermediate circuit 38 is undefined, as it can be any appropriate circuit. An example would be an amplifier, and with appropriate gain from the active devices in launches 10 and 30, compound circuit structure 32 would constitute a three-stage amplifier. Similarly, additional circuitry could be provided in place of, or in addition to, CPW signal conductors 16a and 16b. Said in another way, intermediate circuit apparatus 34 could contain several devices separately or jointly connected to associated CPW sections.

In the structure shown, a microwave signal is input on input microstrip 14a, conducted through launch 10 to input CPW 12a. The signal on the input CPW is processed by intermediate circuit 38 and applied to output CPW 12b. It then passes through launch 30 to output microstrip 14b.

Figure 8:
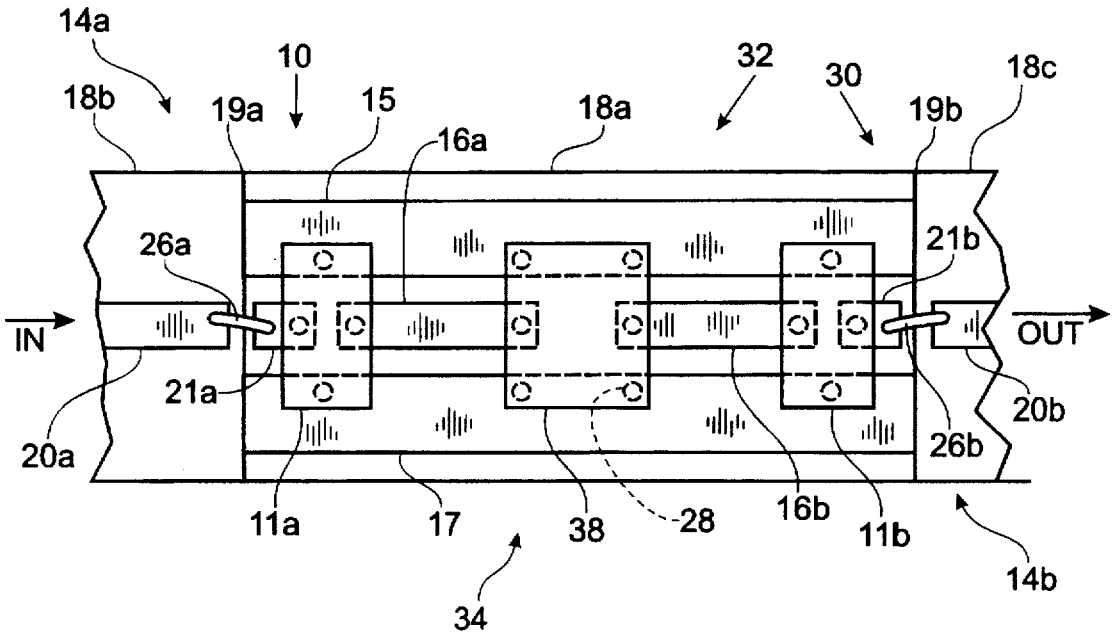
FIG. 8 is a plan view of the embodiment of FIG. 7 using flip-chip mounting of conversion FETs and an intermediate integrated circuit.

FIG. 8 illustrates circuit structure 32 using flip mounting of active devices 11a and 11b, and intermediate circuit 38. Connection of active devices 11a and 11b are as described previously with reference to FIG. 4. The reference numbers applied in FIG. 7 are applied to the same elements in this embodiment, with the addition of input and output microstrip stubs 21a and 21b and associated air bridges or bond wires 26a and 26b.

Figure 9:
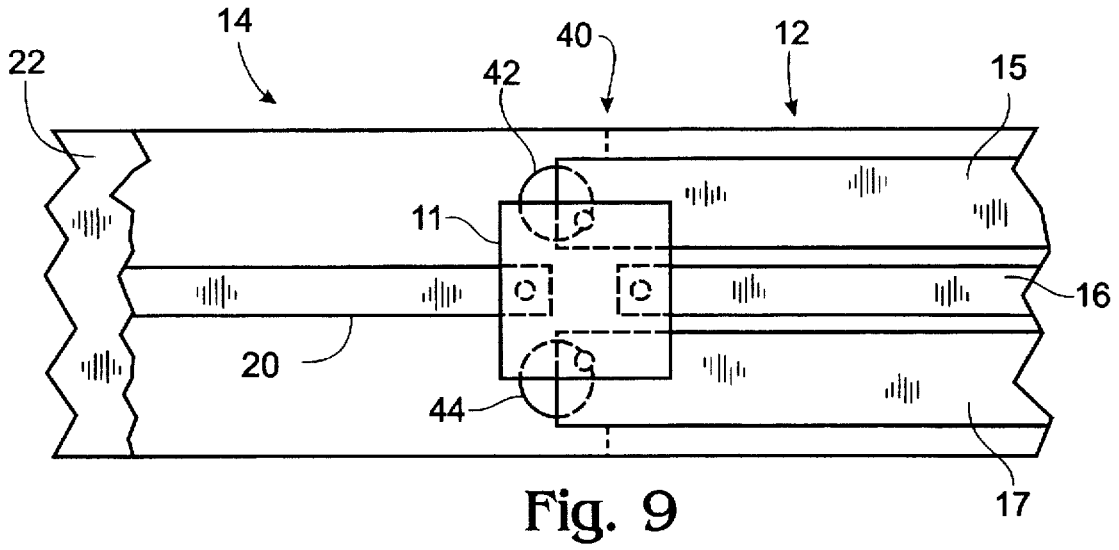
FIG. 9 is a plan view illustrating an embodiment similar to the embodiment of FIG. 4 except that it is made using a unitary substrate with vias for ground connections to the microstrip ground plane.
Figure 10:
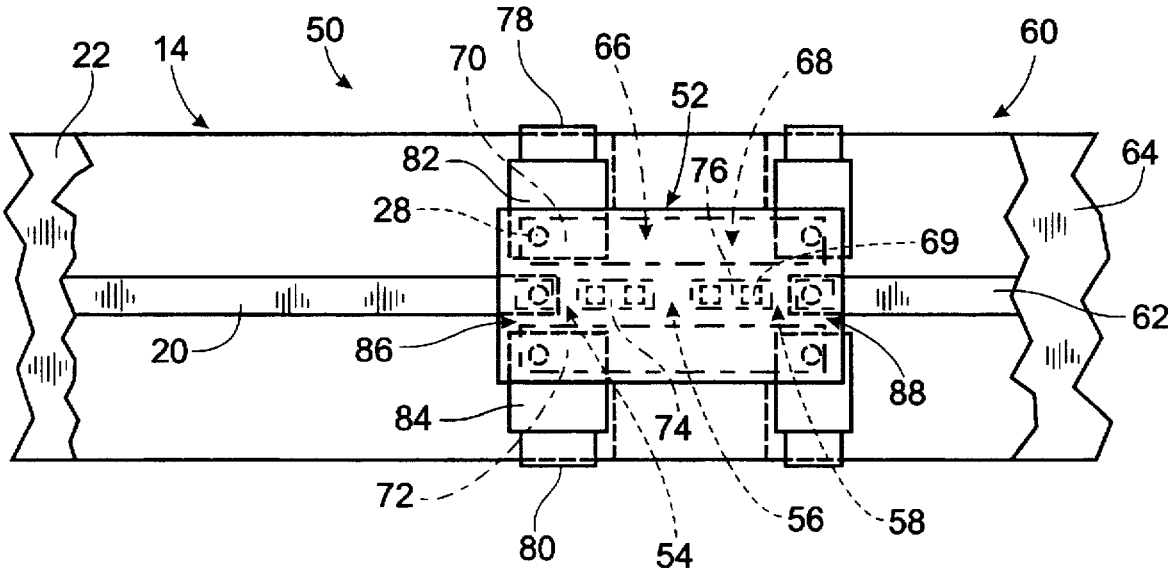
FIG. 10 is a plan view of an embodiment having a single substrate with lateral edge wraparounds for ground connections and a single MMIC.

Connection of the ground planes of the input and output microstrip transmission lines also may be at butt joints 19a and 19b, as illustrated in FIG. 5. FIGS. 9 and 10 show two-other structures for accomplishing the same result, but with the further advantage of building the launch on a single unitary substrate 18.

FIG. 9 shows a launch 40 having a microstrip 14 coupled to a CPW 12 by an active device 11. Ground plane 22 of the microstrip is connected to ground strips 15 and 17 of the CPW by vias 42 and 44. The chip shown as active device 11 could also be configured as a MMIC containing active device 11 and an intermediate circuit, such as circuit 38 shown in FIG. 8. In such an embodiment, the CPW between active device 11 and circuit 38 could be formed on the MMIC as well.

FIG. 10 shows as yet another embodiment of the invention, a circuit structure 50. This circuit structure includes an input microstrip 14 coupled to a MMIC 52. This MMIC includes, for purposes of illustration, an input active device 54, and intermediate circuit 56, and an output active device 58. It is thus equivalent to the three chips shown in FIG. 8 containing devices 11a and 11b, and intermediate circuit 38. Certainly many other circuit configurations are possible, depending on the application for which it is designed.

Output active device 58 is connected to an output microstrip 60. The output microstrip has a signal conductor 62 and a ground plane 64 on opposite faces of substrate 18, as shown. MMIC 52 further has a first CPW 66 extending between active device 54 and circuit 56. Similarly, a second CPW 68 extends between circuit 56 and active device 58. The resident connections between the circuits and the CPWs on the MMIC are represented by pads 69. The active devices and CPWs are all contained on the MMIC. CPWs 66 and 68 are formed by common ground strips 70 and 72 and separate respective center conductors 74 and 76.

Ground plane 22 of the input microstrip is connected to ground strips 70 and 72 of the CPW by wraparounds 78 and 80 extending around the lateral edges of substrate 18, connected respectively, to land pads 82 and 84, and associated bonds 28, as shown. Similarly, ground plane 64 of the output microstrip is connected to the CPWs on the MMIC via associated ground strips, land pads and bonds. It will thus be understood that input active device 54 and output active device 58, and the respective associated connections form respective input and output launches 86 and 88. The launches to and from the CPWs are thus resident on MMIC 52.

It will be appreciated that the use of vias and wraparounds, made using conventional techniques, may also be used in the dual-substrate embodiments described previously, with appropriate use of air bridges or bond wires to connect across the substrate joint(s).

The use of the unitary substrate also simplifies the connection between microstrip signal conductor and the active device. In FIGS. 9 and 10, rather than having a stub to which the microstrip signal conductor is connected via an air bridge, the active device is flip mounted directly to the end of the microstrip signal conductor.

Although the present invention has been described in detail with reference to a particular preferred embodiments, persons possessing ordinary skill in the art to which this invention pertains will appreciate that various modifications and enhancements may be made without departing from the spirit and scope of the claims that follow. The above disclosures are intended to educate the reader about preferred embodiments, and are not intended to constrain the limits of the invention or the scope of the claims.

What is claimed is:

1. An electrical circuit apparatus for converting transmission of signals between a microstrip transmission line and a coplanar wave guide transmission line comprising:

substrate means having opposite faces;

a microstrip transmission line having a signal conductor mounted on one face of the substrate and a ground plane mounted to the other face of the substrate;

a coplanar wave guide having a center conductor and two coplanar ground strips mounted on the one face of the substrate means;

means coupling the ground plane to the two ground strips; and an active device having a control terminal, an output terminal, and a common terminal, the active device being [mounted adjacent to the substrate] *flip-mounted to the coplanar wave guide* with the control terminal and the output terminal each coupled to a different respective one of the signal conductor and the center conductor, and with the at least one common terminal coupled to one of the ground strips, so that the active device couples a signal between the signal conductor and the center conductor.

2. An apparatus according to claim 1 in which the active device is a field effect transistor.

3. An apparatus according to claim 1 in which the active device is a MMIC.

4. An apparatus according to claim 3 in which the coplanar waveguide is formed on the MMIC.

[5. An apparatus according to claim 1 wherein the active device is flip-mounted to the coplanar wave guide.]

6. An apparatus according to claim [5] *1* wherein the active device iS also flip-mounted to the signal conductor.

7. An apparatus according to claim 6 wherein the substrate means comprises first and second coplanar substrates, with the microstrip transmission line mounted on the first substrate and the coplanar wave guide mounted on the second substrate.

8. An apparatus according to claim 7 wherein the microstrip transmission line includes a signal conductor extension mounted on the second.substrate and connected to the signal conductor mounted on the first substrate.

9. An apparatus according to claim 1 wherein the substrate means comprises first and second substrates, with the microstrip transmission line mounted on the first substrate and the coplanar wave guide mounted on the second substrate.

10. An apparatus according to claim 9 wherein the first and second substrates have adjacent edges and the coupling means comprises conductor means extending between the adjacent edges.

11. An apparatus according to claim 1 wherein the substrate means comprises a unitary substrate.

12. An apparatus according to claim 11 wherein substrate has opposing lateral edges and the coupling means comprises a conductive strip extending around each lateral edge.

13. An electrical circuit apparatus for processing signals comprising:

substrate means having opposite faces;

an input microstrip transmission line having an input signal conductor mounted on one face of the substrate and an input ground plane mounted to the other face of the substrate;

an input coplanar wave guide having an input center conductor and two coplanar input ground strips mounted on the one face of the substrate means;

means coupling the input ground plane to the two input ground strips;

an input active device having a control terminal, an output terminal, and two common terminals, the active device being mounted adjacent to the substrate with the control terminal coupled to the input signal conductor and the output terminal coupled to the input center conductor, and the two common terminals coupled to respective ones of the input ground strips;

an output coplanar wave guide having an output center conductor and two coplanar output ground strips mounted on the one face of the substrate means;

an intermediate circuit mounted to the input coplanar wave guide and the output coplanar wave guide for processing a signal received on the input coplanar wave guide and outputting the processed signal on the output coplanar wave guide;

an output microstrip transmission line having an output signal conductor mounted on one face of the substrate and an output ground plane mounted to the other face of the substrate;

an output active device having a control terminal, an output terminal, and two common terminals, the output active device being mounted adjacent to the substrate with the control terminal coupled to the output center conductor and the output terminal coupled to the output signal conductor, and the two common terminals coupled to respective ones of the output ground strips;

means coupling the two output ground strips to the output ground plane;

whereby a signal input on the input microstrip transmission line is transmitted to and from the intermediate circuit via coplanar wave guides, and output on the output microstrip transmission line.

14. An apparatus according to claim 13 wherein the intermediate circuit is on a chip flip mounted to the input and output coplanar wave guides.

15. An apparatus according to claim 13 wherein the input device and the output device are on a single MMIC.

16. An apparatus according to claim 15 wherein the input and output coplanar waveguides are also on the MMIC.

17. An apparatus according to claim 16 wherein the MMIC is flip mounted to the input and output microstrip transmission lines.

18. An apparatus according to claim 16 wherein the intermediate circuit is also on the MMIC.

19. An apparatus according to claim 15 wherein the intermediate circuit is also on the MMIC.

* * * * *